(12) United States Patent
Yang et al.

(10) Patent No.: US 12,294,881 B2
(45) Date of Patent: May 6, 2025

(54) USER EQUIPMENT (UE) MEASUREMENT GAP REQUEST AND RELEASE FOR POWER SAVINGS AND MULTIPLE SUBSCRIBER IDENTITY MODULE (MSIM) MEASUREMENTS

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 17/317,784

(22) Filed: May 11, 2021

(65) Prior Publication Data
US 2022/0014955 A1     Jan. 13, 2022

Related U.S. Application Data

(60) Provisional application No. 63/050,718, filed on Jul. 10, 2020.

(51) Int. Cl.
*H04W 76/25*     (2018.01)
*H04W 24/10*     (2009.01)
*H04W 76/27*     (2018.01)

(52) U.S. Cl.
CPC ........... *H04W 24/10* (2013.01); *H04W 76/25* (2018.02); *H04W 76/27* (2018.02)

(58) Field of Classification Search
CPC ..... H04W 24/10; H04W 76/25; H04W 76/27; H04W 72/23; H04W 72/21;
(Continued)

(56) References Cited

U.S. PATENT DOCUMENTS 9,226,191 B1    12/2015    Vivanco et al.
9,942,009 B2 *    4/2018    Reial .................. H04W 56/001
(Continued)

OTHER PUBLICATIONS

Ericsson: "Dense PRS Configurations", 3GPP Draft, 3GPP TSG-RAN2 Meeting #102, R2-1807770, 3rd Generation Partnership Project (3GPP), Mobile Competence Centre, 650, Route Des Lucioles, F-06921 Sophia-Antipolis Cedex, France, vol. RAN WG2, No. Busan, South Korea, May 21, 2018-May 25, 2018 May 20, 2018 (May 20, 2018), XP051444113, pp. 1-4, Retrieved from the Internet: URL: http://www.3gpp.org/ftp/Meetings%5F3GPP%5FSYNC/RAN2/Docs/ [retrieved on May 20, 2018] the whole document.
(Continued)

*Primary Examiner* — Liem H. Nguyen
(74) *Attorney, Agent, or Firm* — Arun Swain

(57) ABSTRACT

A method for wireless communication performed by a user equipment (UE) includes transmitting, to a first network, a first message comprising a first measurement gap configuration, a measurement gap reconfiguration, a selection from a measurement gap pool, or a measurement gap release. The method also includes receiving a second message, from the first network. The second message may configure a measurement gap, reconfigure a measurement gap, or release a measurement gap. The second message may also suspend data communication from the UE during a configured measurement gap. The method additionally includes suspending communication with the first network during the configured measurement gap. The communication may be suspended to save power, tune away for a multiple subscriber identity module (MSIM) of the UE, or measure a neighbor cell.

20 Claims, 7 Drawing Sheets

(58) Field of Classification Search
CPC ......... H04W 52/0216; H04W 52/0261; H04W 76/28; H04W 88/06; Y02D 30/70
See application file for complete search history.

(56) References Cited

U.S. PATENT DOCUMENTS

| | | | |
|---|---|---|---|
| 2007/0097914 A1* | 5/2007 | Grilli | H04W 36/0088 455/450 |
| 2010/0323633 A1* | 12/2010 | Pani | H04W 24/10 455/67.14 |
| 2010/0323753 A1* | 12/2010 | Imamura | H04B 7/0689 455/552.1 |
| 2011/0243002 A1* | 10/2011 | Tsuruoka | H04W 24/04 370/252 |
| 2012/0088516 A1* | 4/2012 | Ji | H04W 24/02 455/452.1 |
| 2014/0341192 A1* | 11/2014 | Venkob | H04W 52/0216 370/336 |
| 2015/0016282 A1* | 1/2015 | Su | H04W 36/0085 370/252 |
| 2015/0071101 A1* | 3/2015 | Mager | H04W 24/10 370/332 |
| 2015/0117287 A1* | 4/2015 | Kim | H04W 52/0241 370/311 |
| 2015/0139053 A1* | 5/2015 | Van Lieshout | H04W 52/0229 370/311 |
| 2015/0280880 A1* | 10/2015 | Yang | H04L 1/1812 370/329 |
| 2015/0327295 A1* | 11/2015 | Yang | H04W 36/0085 370/337 |
| 2015/0373671 A1 | 12/2015 | Yang et al. | |
| 2016/0337893 A1* | 11/2016 | Gheorghiu | H04W 24/10 |
| 2016/0365912 A1* | 12/2016 | Yang | H04W 8/183 |
| 2016/0381588 A1* | 12/2016 | Strobl | H04W 24/10 455/67.11 |
| 2018/0006774 A1* | 1/2018 | Yiu | H04W 24/10 |
| 2018/0084601 A1* | 3/2018 | Dhanapal | H04W 76/30 |
| 2018/0302942 A1* | 10/2018 | Wu | H04W 76/27 |
| 2018/0367564 A1* | 12/2018 | Basu Mallick | H04L 63/1416 |
| 2019/0253909 A1* | 8/2019 | Yiu | H04W 72/0453 |
| 2020/0120527 A1* | 4/2020 | Fan | H04W 72/04 |
| 2020/0288337 A1* | 9/2020 | Callender | H04W 24/10 |
| 2020/0344633 A1* | 10/2020 | Zhang | H04W 24/10 |
| 2021/0014667 A1* | 1/2021 | Lovlekar | H04W 88/06 |
| 2021/0051585 A1* | 2/2021 | Kim | H04W 76/28 |
| 2021/0227534 A1* | 7/2021 | Määttanen | G08G 5/0069 |
| 2021/0410107 A1* | 12/2021 | Park | H04W 76/27 |
| 2022/0060923 A1* | 2/2022 | Zheng | H04W 24/10 |
| 2022/0104059 A1* | 3/2022 | Hu | H04W 24/02 |
| 2022/0124529 A1* | 4/2022 | Yiu | H04W 76/15 |
| 2022/0286887 A1* | 9/2022 | Zheng | H04W 24/10 |
| 2022/0287004 A1* | 9/2022 | Fujishiro | H04W 8/22 |
| 2023/0362920 A1* | 11/2023 | Niu | H04B 17/15 |

OTHER PUBLICATIONS

International Search Report and Written Opinion—PCT/US2021/032056—ISA/EPO—Aug. 30, 2021.

* cited by examiner

USER EQUIPMENT (UE) MEASUREMENT GAP REQUEST AND RELEASE FOR POWER SAVINGS AND MULTIPLE SUBSCRIBER IDENTITY MODULE (MSIM) MEASUREMENTS

CROSS-REFERENCE TO RELATED APPLICATION

The present application claims the benefit of U.S. Provisional Patent Application No. 63/050,718, filed on Jul. 10, 2020, and titled "USER EQUIPMENT (UE) NEW RADIO (NR) MEASUREMENT GAP REQUEST AND RELEASE FOR POWER SAVINGS AND MULTIPLE SUBSCRIBER IDENTITY MODULE (MSIM) MEASUREMENTS," the disclosure of which is expressly incorporated by reference in its entirety.

FIELD OF THE DISCLOSURE

Aspects of the present disclosure generally relate to wireless communications, and more particularly to techniques and apparatuses for a user equipment (UE) assisted measurement gap request and release for power savings and multiple subscriber identity module (MSIM) measurements.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

The present disclosure is set forth in the independent claims, respectively. Some aspects of the disclosure are described in the dependent claims.

According to an aspect of the present disclosure, a method for wireless communication performed by a user equipment (UE) is presented. The method includes transmitting, to a first network, a first message comprising a first measurement gap configuration, a measurement gap reconfiguration, a selection from a measurement gap pool, or a measurement gap release request. The method also includes receiving a second message, from the first network to configure, reconfigure, or release a measurement gap and to suspend data communication from the UE during a configured measurement gap. The method further includes suspending communication with the first network during the configured measurement gap.

In another aspect of the present disclosure, a method for wireless communication performed by a base station is presented. The method includes transmitting, to a UE, a first message comprising a measurement gap configuration. The method also includes receiving, from the UE, a second message. The method further includes transmitting, to the UE, a third message comprising at least one of a measurement gap setup, a measurement gap timer duration, or a measurement gap release.

In another aspect of the present disclosure, a UE for wireless communication is presented. The UE includes a processor, and a memory coupled with the processor. Instructions stored in the memory are operable, when executed by the processor, to cause the UE to transmit, to a first network, a first message comprising a first measurement gap configuration, a measurement gap reconfiguration, a selection from a measurement gap pool, or a measurement gap release request. The instruction may also cause the UE to receiving a second message, from the first network to configure, reconfigure, or release a measurement gap and to suspend data communication from the UE during a configured measurement gap. The instruction may further cause the UE to suspend communication with the first network during the configured measurement gap.

In another aspect of the present disclosure, a base station for wireless communication is presented. The base station includes a processor, and a memory coupled with the processor. Instructions stored in the memory are operable, when executed by the processor, to cause the base station transmit, to a UE, a first message comprising a measurement gap configuration. The instruction may also cause the base station to receive, from the UE, a second message. The instruction may further cause the base station to transmit, to the UE, a third message comprising at least one of a measurement gap setup, a measurement gap timer duration, or a measurement gap release.

In another aspect of the present disclosure, a UE for wireless communication is presented. The UE includes means for transmitting, to a first network, a first message comprising a first measurement gap configuration, a measurement gap reconfiguration, a selection from a measurement gap pool, or a measurement gap release request. The UE also includes means for receiving a second message, from the first network to configure, reconfigure, or release a measurement gap and to suspend data communication from the UE during a configured measurement gap. The UE further includes means for suspending communication with the first network during the configured measurement gap.

In another aspect of the present disclosure, a base station for wireless communication is presented. The base station includes means for transmitting, to a UE, a first message comprising a measurement gap configuration. The base station also includes means for receiving, from the UE, a second message. The base station further includes means for transmitting, to the UE, a third message comprising at least one of a measurement gap setup, a measurement gap timer duration, or a measurement gap release.

In yet another aspect of the present disclosure, a non-transitory computer-readable medium with program code recorded thereon is disclosed. The program code is executed by a UE and includes code to transmit, to a first network, a first message comprising a first measurement gap configuration, a measurement gap reconfiguration, a selection from a measurement gap pool, or a measurement gap release request. The program code also includes code to receive a second message, from the first network to configure, reconfigure, or release a measurement gap and to suspend data communication from the UE during a configured measurement gap. The program code further includes code to suspend communication with the first network during the configured measurement gap.

In yet another aspect of the present disclosure, a non-transitory computer-readable medium with program code recorded thereon is disclosed. The program code is executed by a base station and includes program code to transmit, to a UE, a first message comprising a measurement gap configuration. The program code also includes code to receive, from the UE, a second message. Furthermore, the program code includes code to transmit, to the UE, a third message comprising at least one of a measurement gap setup, a measurement gap timer duration, or a measurement gap release.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
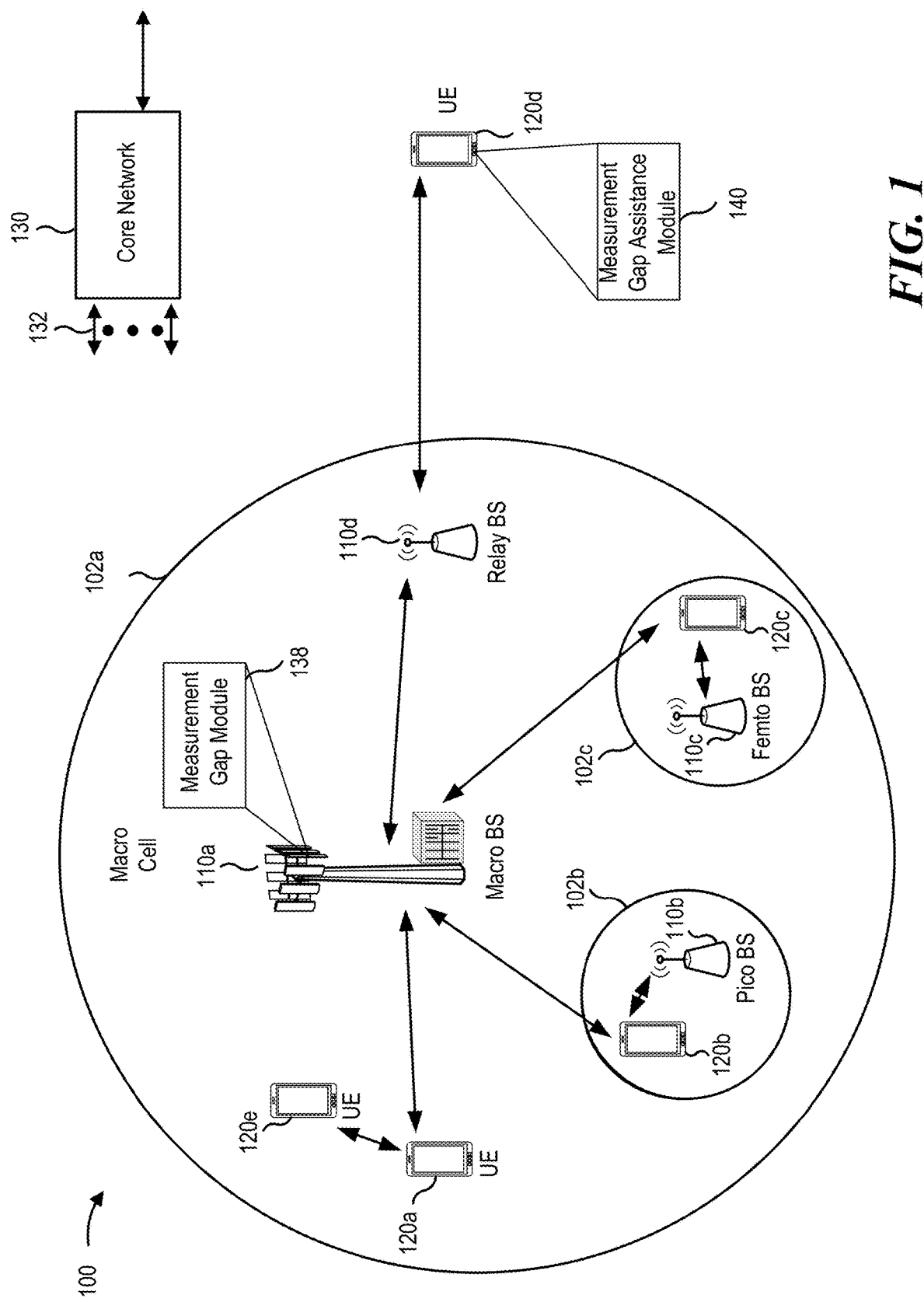
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

It is desirable for a user equipment (UE) to provide assistance information for configuring one or more elements of a measurement gap. Aspects of the present disclosure are directed to UE assisted measurement gap requests and releases. As an example, the UE may transmit a measurement gap request and/or a measurement gap release to perform measurements, tune away for one subscriber identity module (SIM) of a multiple-SIM configuration, and/or save power.

In one configuration, the UE transmits, to a first network (e.g., an LTE network), a first message including a measurement gap configuration, a measurement gap reconfiguration, a selection from a measurement gap pool, or a measurement gap release. The UE may receive, from the first network, a second message configuring a measurement gap, reconfiguring a measurement gap, releasing a measurement gap, or indicating a selection from the measurement gap pool. The second message may also suspend data communication from the UE during a configured measurement gap. The UE may suspend communication with the first network during the configured measurement gap. The communication may be suspended for power savings, a multiple subscriber identity module (MSIM) tune away, or measuring a neighbor cell.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB,", and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (e.g., smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

The UEs 120 may include a measurement gap assistance module 140. For brevity, only one UE 120d is shown as including the measurement gap assistance module 140. The measurement gap assistance module 140 may transmit, to a first radio access technology (RAT), a first message comprising a first measurement gap configuration, a measurement gap reconfiguration, a selection from a measurement gap pool, or a measurement gap release. The measurement gap assistance module 140 may also receive a second message, from the first RAT, to configure, reconfigure, or release a measurement gap. The second message may also be configured to suspend data communication from the UE during a configured measurement gap. The measurement gap assistance module 140 may also suspend communication with the first RAT during the configured measurement gap. The communication may be suspended to save power, perform a multiple subscriber identity module (MSIM) tune away, and/or measure a neighbor cell.

The base stations 110 may include a measurement gap module 138 for transmitting, to a user equipment (UE) 120, a first message comprising a measurement gap configuration. The measurement gap module 138 may be configured to receive, from the UE 120, a second message. The measurement gap module 138 may also be configured to transmit, to the UE 120, a third message comprising a measurement gap release.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
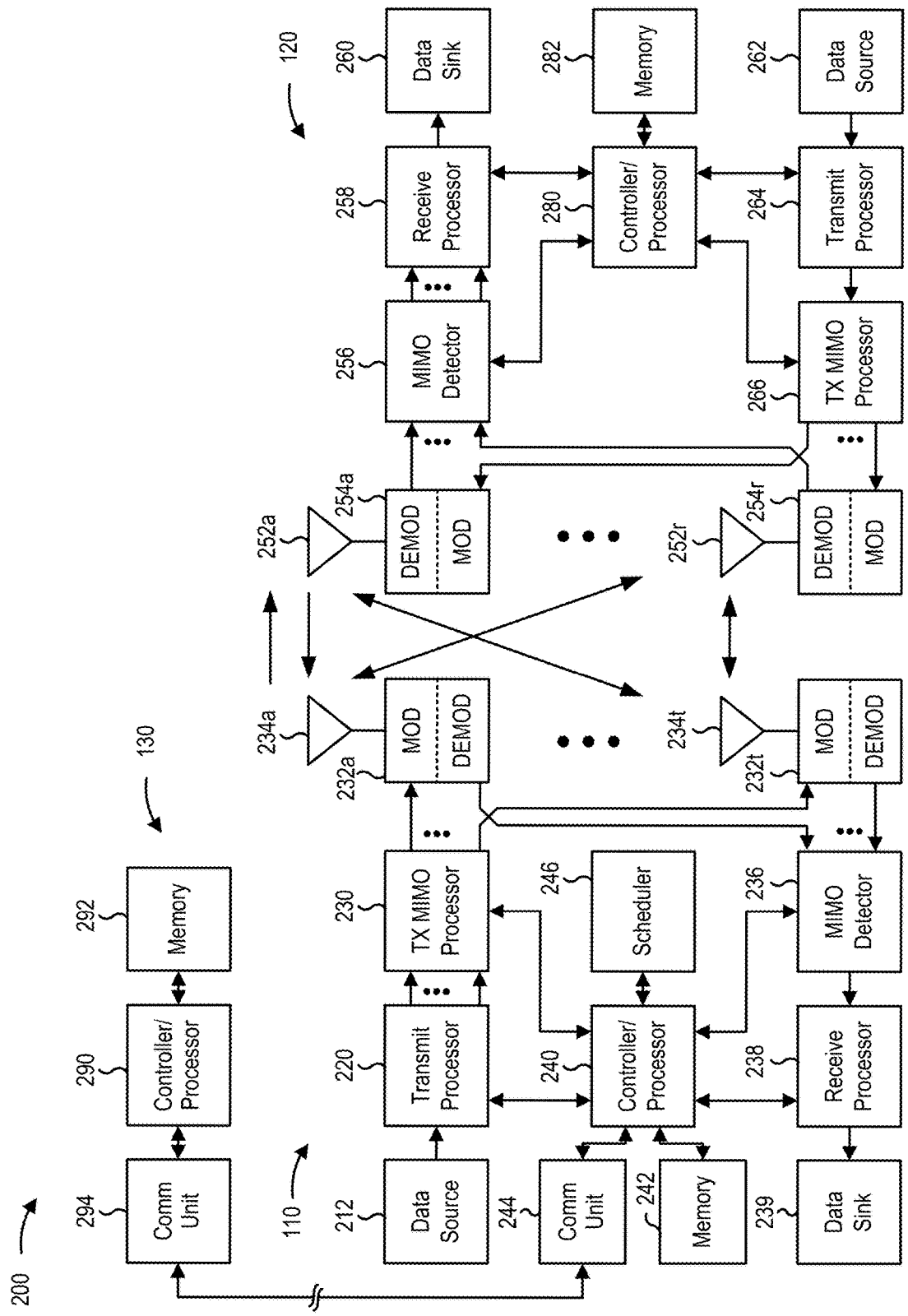
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with UE assisted measurement gap configuration as described in more detail elsewhere. For example, the controller/processor 240 of the base station 110, the controller/processor 280 of the UE 120, and/or any other component(s) of FIG. 2 may perform or direct operations of, for example, the processes of FIGS. 6 and 7, and/or other described processes. Memories 242 and 282 may store data and program codes for the base station 110 and UE 120, respectively. A scheduler 246 may schedule UEs for data transmission on the downlink and/or uplink.

In some aspects, the UE 120 may include means for receiving, means for transmitting, and means for suspending. In some aspects, the base station 110 may include means for receiving and means for transmitting. Such means may include one or more components of the UE 120 or base station 110 described in connection with FIG. 2.

As indicated above, FIG. 2 is provided merely as an example. Other examples may differ from what is described with regard to FIG. 2.

In 5G deployments, the 5G coverage may not be uniform. That is, some areas may receive better coverage in comparison to other areas. As such, there may be areas where 5G signals are not measurable by the user equipment (UE). A UE may measure 5G signals when connected (e.g., radio resource control (RRC) connected mode) to a long term evolution (LTE) master node (MN). The 5G signals may be measured during a measurement gap.

Figure 3:
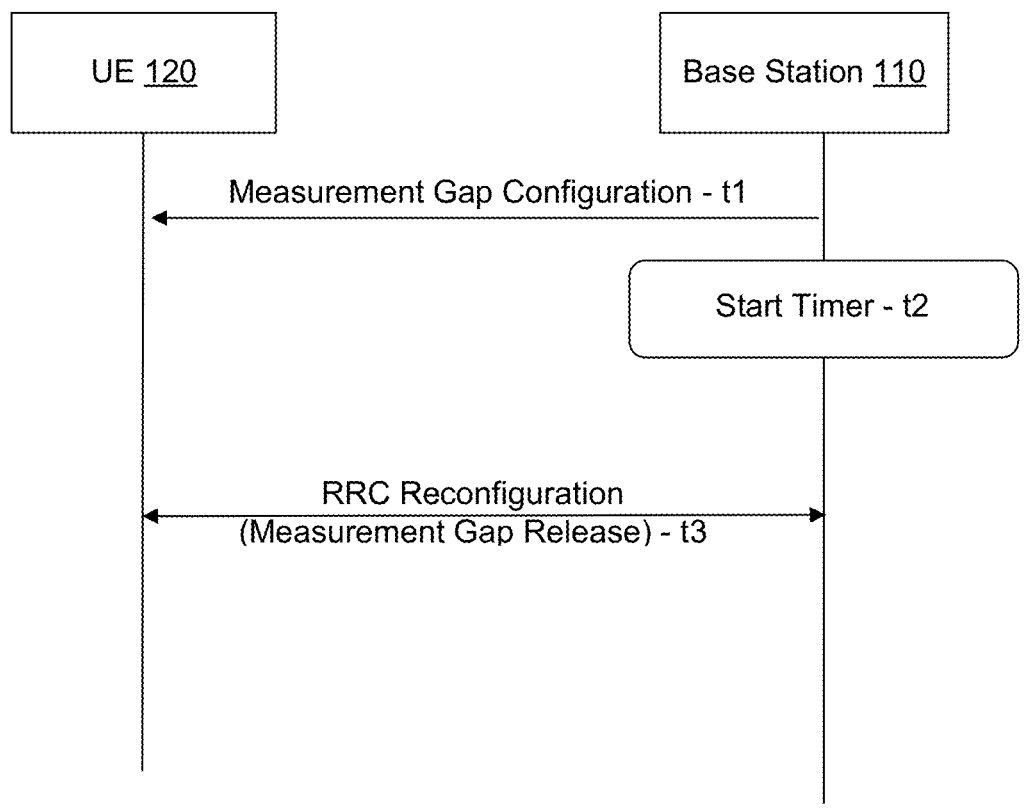
FIG. 3 is a timing diagram illustrating an example of receiving a measurement gap configuration when in a connected mode.

FIG. 3 is a timing diagram 300 illustrating an example of receiving a measurement gap configuration when in a connected mode. In the example of FIG. 3, a UE 120, as described in FIG. 1, may be in a connected mode (e.g., RRC connected mode) with a base station 110, as described in FIG. 1. The base station 110 of FIG. 3 may be an example of an LTE master node (MN).

As shown in FIG. 3, at time t1, the base station 110 transmits a measurement gap configuration to the UE 120. The measurement gap configuration may be a master node measurement gap configuration for measuring 5G signals. The measurement gap configuration may indicate a measurement gap length (e.g., duration), such as 1.5 ms, 3 ms, 3.5 ms, 4 ms, 5.5 ms, and 6 ms, and a measurement gap periodicity, such as 20 ms, 40 ms, 80 ms, and 160 ms. For example, the measurement gap may repeat every 20 ms and may have a 1.5 ms duration. At time t1, the base station 110 may also transmit a new radio measurement configuration (not shown in FIG. 3).

Reducing a length and/or periodicity of measurement gaps may increase LTE throughput. However, reducing the length and/or periodicity of the measurement gaps may delay detecting a 5G network when the UE 120 enters an area with 5G coverage.

In some cases, the UE 120 may detect a 5G network during the measurement gap and may transmit a measurement report to the base station 110 (not shown in FIG. 3). The base station 110 may release the measurement gap in response to receiving the measurement report.

In other cases, the UE 120 may not detect the 5G network during the measurement gap, and the base station 110 does not receive a measurement report from the UE 120. In such cases, the behavior of the base station 110 (e.g., LTE network) is undefined. In one example, the base station 110 may maintain the measurement gap. That is, the base station 110 may not release the measurement gap. In this example, maintaining the measurement gap may reduce LTE throughput because data scheduling may not be performed during a measurement gap.

As another example, as shown in FIG. 3, the base station 110 initiates a timer (at time t2) after transmitting the measurement gap configuration (at time t1). The timer may be referred to as a measurement gap valid timer. In this example, the base station 110 releases the measurement gap (at time t3) if the UE 120 does not transmit a measurement report before expiration of the timer. As shown in FIG. 3, the base station 110 transmits an RRC reconfiguration message to release the measurement gap (at time t3).

The timer duration may be blindly configured by the base station 110. As such, the timer duration may be less than a time needed by the UE 120 to measure 5G signals. As such, the base station 110 may miss an opportunity for receiving a measurement report and/or adding a 5G network.

It is desirable for a UE to provide assistance information for configuring one or more elements of a measurement gap. Aspects of the present disclosure are directed to UE assisted measurement gap requests and releases. As an example, the UE may transmit a measurement gap request and/or a measurement gap release to perform measurements (e.g., neighbor cell measurements), perform a multiple-SIM (MSIM) tune away, and/or save power. The measurement gap request and/or a measurement gap release may be transmitted for purposes other than performing measurements, performing an MSIM tune away, and saving power.

In one configuration, during call setup, the UE may indicate its preferred measurement gap duration, measurement gap periodicity, and/or a measurement gap valid timer duration. The base station may configure the measurement gap and/or the timer as indicated in the preferences by the UE.

Figure 4:
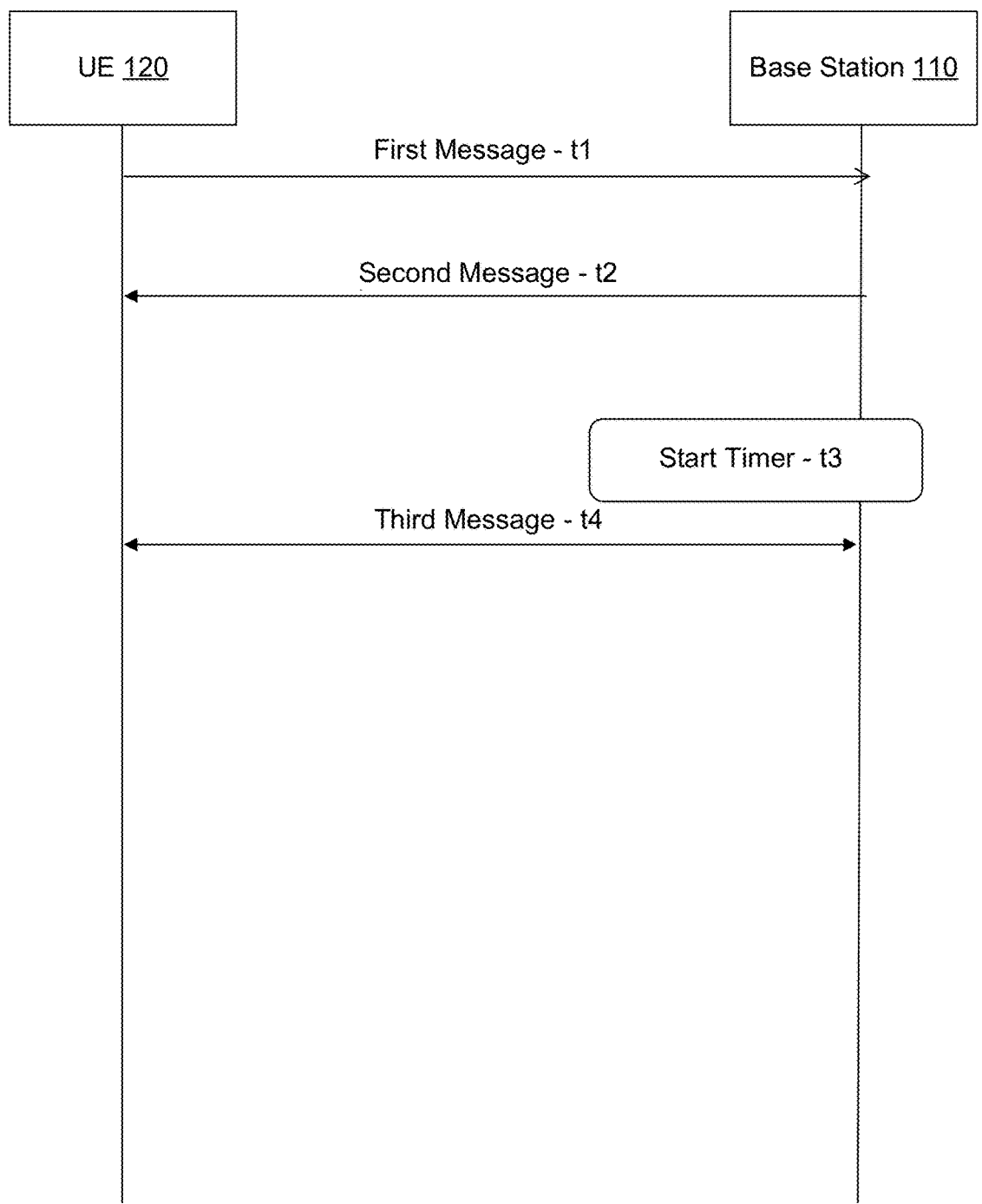
FIG. 4 is a timing diagram illustrating an example of a user equipment (UE) providing measurement gap preferences to a base station, in accordance with aspects of the present disclosure.

FIG. 4 is a timing diagram 400 illustrating an example of a UE 120 providing measurement gap preferences to a base station 110, in accordance with aspects of the present disclosure. In the example of FIG. 4, a UE 120, as described in FIG. 1, may be performing a call setup with a base station 110, as described in FIG. 1. The base station 110 of FIG. 4 may be an example of an LTE master node (MN).

In the example of FIG. 4, at time t1, the UE 120 transmits a first message to the base station 110. The first message may include a preferred measurement gap configuration indicating one or more of a measurement gap periodicity, a measurement gap duration (e.g., length), and a measurement gap valid timer duration. As described, the first message may be transmitted during a call setup, such as an RRC setup. In one configuration, the first message includes an RRC setup request message, a call resume request message, or a handover request message. Additionally, or alternatively, the first message may be a measurement report.

As shown in FIG. 4, at time t2, the base station 110 transmits a second message to the UE 120. The second message may be an RRC setup message, an RRC resume message, a handover command, or an RRC configuration message. In one configuration, the second message is transmitted in response to the first message. Alternatively, transmission of the second message is not dependent on the first message. The second message may include a measurement gap configuration in accordance with the preferred measurement gap configuration, a measurement gap reconfiguration, and/or a measurement gap release.

In some implementations, the UE 110 may measure, or attempt to measure, a neighbor cell, such as a 5G cell, during a measurement gap configured according to the measurement gap configuration or reconfiguration received in the second message. The UE 110 may transmit a measurement report to the base station 110 if the UE successfully measures the neighbor cell (not shown in FIG. 4) during the configured measurement gap.

In the example of FIG. 4, the base station 110 may initiate a timer (e.g., measurement gap valid timer), at time t3, in response to transmitting the second message. The duration of the measurement gap valid timer may be configured according to the preferred measurement gap configuration received in the first message (time t1).

In the example of FIG. 4, the base station 110 releases the measurement gap if the UE 120 does not transmit a measurement report before expiration of the measurement gap valid timer. In this example, at time t4, the base station 110 transmits a third message including a measurement gap release if a measurement report was not received from the UE 120 before expiration of the measurement gap valid timer. The third message may be a radio resource control (RRC) reconfiguration message.

According to aspects of the present disclosure, the UE 120 and/or the base station 110 may transmit a measurement gap configuration or a measurement gap release request via one or more messages, such as radio resource control (RRC) message, a medium access control-control element (MAC-CE) message, a downlink control information (DCI) message, or a channel state information (CSI) message.

Figure 5:
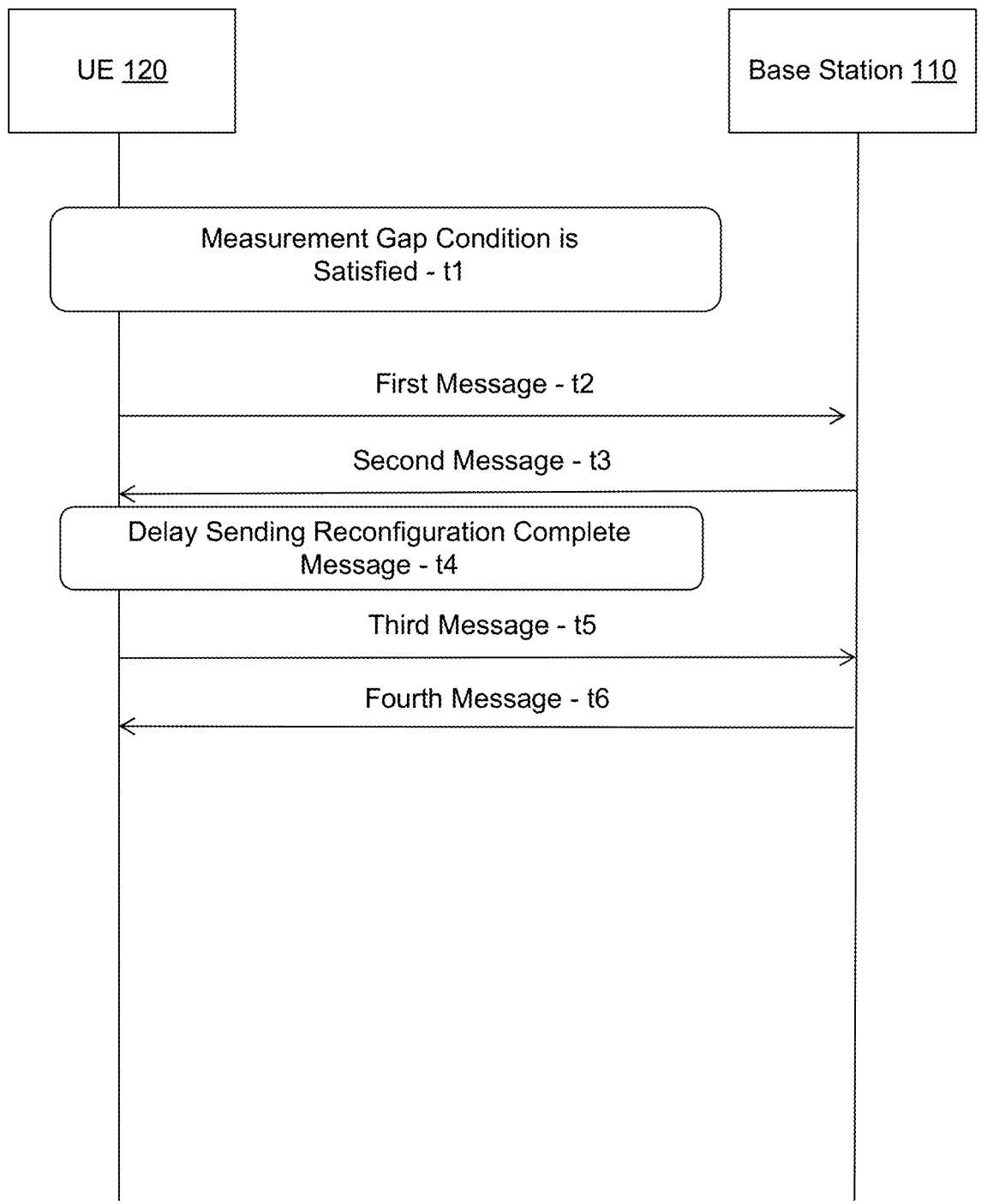
FIG. 5 is a timing diagram illustrating an example of transmitting a measurement gap configuration and/or a measurement gap release request, in accordance with aspects of the present disclosure.

FIG. 5 is a timing diagram 500 illustrating an example of transmitting a measurement gap configuration and/or a measurement gap release request, in accordance with aspects of the present disclosure. In the example of FIG. 5, a UE 120, as described in FIG. 1, may be in an LTE connected mode with a base station 110, as described in FIG. 1. The base station 110 of FIG. 5 may be an example of an LTE master node (MN).

At time t1, while in the connected mode, a measurement gap condition is satisfied. The measurement gap condition may include one or more conditions for triggering the UE 120 to request a measurement gap from the base station 110.

For example, the measurement gap condition may be satisfied when the UE 120 initiates a search for a neighboring NR cell using historical data. The search may be a background search. In one configuration, the search may be initiated due to a change in a battery level of the UE 120.

As another example, the UE 120 may request a measurement gap due to an overheating condition or a battery condition. That is, the measurement gap condition may be satisfied (at time t1) if the battery level is less than a battery threshold or a heat level of the UE 120 is greater than a heat threshold. Accordingly, the measurement gap may be requested to save power or reduce heat.

In some implementations, the UE 120 is a multiple subscriber identity module (MSIM) UE. In this implementation, the measurement gap condition may be satisfied when a tune-away is initiated for one of the multiple SIMS. As an example, for the tune away, the UE may transmit a measurement gap configuration and/or a measurement gap release request.

In response to satisfying the measurement gap condition (at time t1), the UE 120 transmits a first message to the base station 110 (at time t2). The first message may be a radio resource control (RRC) message, a channel state information (CSI) message, or a medium access control-control element (MAC-CE) message. Additionally, the first message may include a measurement gap configuration, a measurement gap reconfiguration, a selection from a measurement gap pool, and/or a measurement gap release request. The measurement gap configuration and reconfiguration included in the first message may request a measurement gap duration and/or a measurement gap periodicity. The measurement gap duration may be in response to a quality of service (QoS), a battery level, UE implementation, or a device temperature.

In one configuration, the base station 110 may configure a set of measurement gaps (e.g., measurement gap pool), where each measurement gap in the set of measurement gaps may have a different duration and/or periodicity. In this configuration, the first message may request one of the measurement gaps from the set of measurement gaps. The request may be transmitted via a bitmap identifying the requested measurement gap, for example.

As shown in FIG. 5, the base station 110 may transmit a second message to the UE 120 (at time t3). The second message may be an RRC message, a MAC-CE message, or a downlink control information (DCI) message. The second message may include a measurement gap configuration, a measurement gap reconfiguration, a selection from the measurement gap pool, and/or a measurement gap release. The second message may also request the UE 120 to suspend communication with the base station 110 during the configured measurement gap.

The second message may be transmitted in response to the first message. Alternatively, the second message may be transmitted independently from transmission of the first message.

The UE may suspend communication with the first network (e.g., an LTE network) during the measurement gap (not shown in FIG. 5) in response to the measurement gap configuration or reconfiguration received in the second message. In one configuration, the UE may tune-away during the measurement gap. The tune-away may be performed for one of the multiple SIMS.

To extend a length of the measurement gap, at time t4, the UE 120 may delay transmission of a reconfiguration complete message, such as an RRC reconfiguration complete message. As described, the length of the measurement gap (e.g., measurement gap duration) may be based on a quality of service (QoS), a battery level, UE implementation, or a device temperature. For example, the UE may delay transmission of the RRC reconfiguration complete message when the battery level is less than the battery threshold.

As shown in FIG. 5, at time t5, the UE 120 transmits a third message to the base station 110. The third message may request a measurement gap release. The third message may be an RRC message (e.g., RRC reconfiguration complete message), a MAC-CE message, or a CSI message.

Additionally, the base station 110 may transmit a fourth message (at time t6). The fourth message may include the measurement gap release. In one implementation, the fourth message is an RRC message (e.g., RRC reconfiguration message), a MAC-CE message, or a DCI message. The fourth message may be transmitted in response to the third message. Alternatively, the fourth message may be transmitted independently from transmission of the third message.

Aspects of the present disclosure include methods for providing UE assistance information for configuring a measurement gap and/or releasing a measurement gap. The UE assistance information may be provided in response to a UE battery condition, traffic quality of service (QoS) specifications, a UE implementation, and/or other factors or conditions.

Aspects of the present disclosure may improve a speed in which measurement gaps are configured and/or released. By improving the measurement gap configuration and/or release speed, aspects of the present disclosure may improve network throughput, such as LTE master node throughput and/or overall evolved universal mobile telecommunications system (UMTS) terrestrial radio access network (E-UTRAN) NR-dual connectivity (ENDC) throughput. Although a non-stand-alone deployment with spotty coverage is referred to, the present disclosure also contemplates a stand-alone deployment. For example, the UE may switch from frequency range one (FR1) to frequency range two (FR2) or vice versa.

As indicated above, FIGS. 3-5 are provided as examples. Other examples may differ from what is described with respect to FIGS. 3-5.

Figure 6:
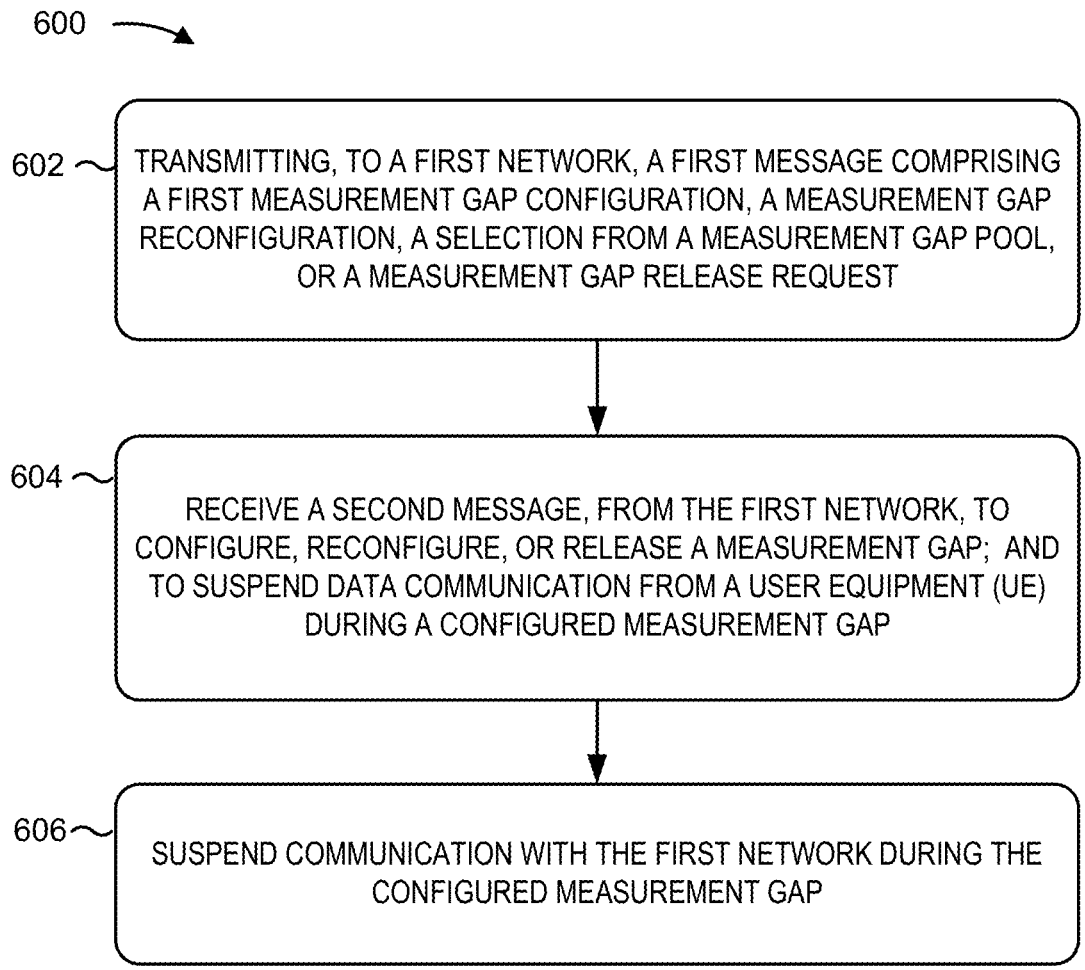
FIG. 6 is a flow diagram illustrating an example process performed, for example, by a user equipment (UE), in accordance with various aspects of the present disclosure.

FIG. 6 is a flow diagram illustrating an example process 600 performed, for example, by a UE, in accordance with various aspects of the present disclosure. The UE may be the UE 120 as described in FIG. 1. The example process 600 is an example of user equipment (UE) measurement gap request and release for power savings and multiple subscriber identity module (MSIM) measurements.

As shown in FIG. 6, in some aspects, the process 600 may include transmitting, to a first network, a first message comprising a first measurement gap configuration, a measurement gap reconfiguration, a selection from a measurement gap pool, or a measurement gap release request (block 602). For example, the UE (e.g., using the antenna 252, DEMOD/MOD 254, TX MIMO processor 266, transmit processor 264, controller/processor 280, and/or memory 282) can transmit, to a first network, a first message such as a measurement gap release request. In some aspects, the first network may be a same radio access technology (RAT) (e.g., standalone deployment) or a different RAT (non-standalone deployment).

In some aspects, the process 600 may include receiving, a second message, from the first network. The second message may configure, reconfigure, or release a measurement gap; and suspend data communication from the UE during a configured measurement gap (block 604). For example, the UE (e.g., using the antenna 252, DEMOD/MOD 254, MIMO detector 256, receive processor 258, controller/processor 280, and/or memory 282) can receive a second message from the first network.

As shown in FIG. 6, in some aspects, the process 600 may include suspending communication with the first network during the configured measurement gap (block 606). For example, the UE (e.g., using the antenna 252, DEMOD/MOD 254, MIMO detector 256, TX MIMO processor 266, receive processor 258, transmit processor 264, controller/processor 280, and/or memory 282) can suspend communication with the first network during the configured measurement gap. In some aspects, the communication may be suspended to save power, perform a multiple subscriber identity module (MSIM) tune away, or measure a neighbor cell.

Figure 7:
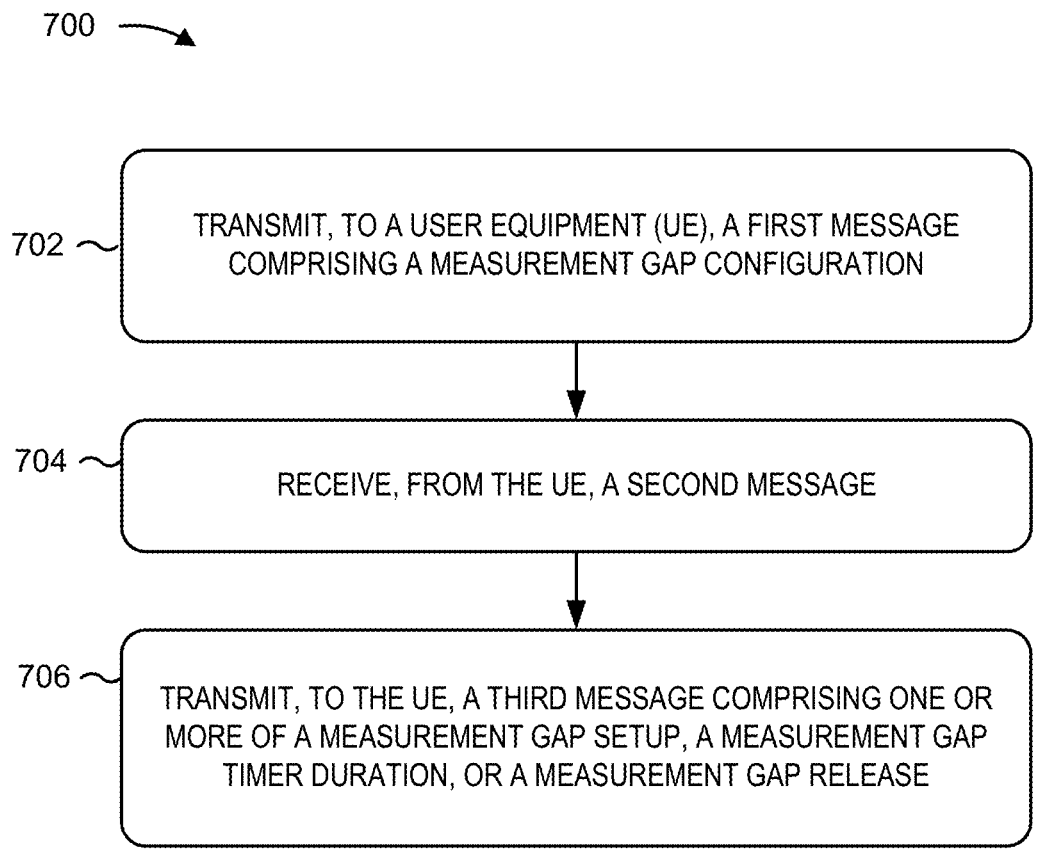
FIG. 7 is a flow diagram illustrating an example process performed, for example, by a base station, in accordance with various aspects of the present disclosure.

FIG. 7 is a flow diagram illustrating an example process 700 performed, for example, by a base station, in accordance with various aspects of the present disclosure. The base station may be the base station 110 as described in FIG. 1. The example process 700 is an example of a measurement gap request and measurement gap release for power savings and multiple subscriber identity module (MSIM) measurements.

As shown in FIG. 7, in some aspects, the process 700 may include transmitting, to a user equipment (UE), a first message comprising a measurement gap configuration (block 702). For example, the base station (e.g., using the antenna 234, MOD/DEMOD 232, TX MIMO processor 230, transmit processor 220, controller/processor 240, and/or memory 242) can transmit, to a UE, a first message comprising a measurement gap configuration. In some aspects, the first message may include a table of measurement gap configurations and associated measurement gap pattern indices.

In some aspects, the process 700 may include receiving, from the UE, a second message (block 704). For example, the base station (e.g., using the antenna 234, MOD/DEMOD 232, MIMO detector 236, receive processor 238, controller/processor 240, and/or memory 242) can receive, from the UE, a second message.

As shown in FIG. 7, in some aspects, the process 700 may include transmitting, to the UE, a third message comprising one or more of a measurement gap setup, a measurement gap timer duration, or a measurement gap release (block 706). For example, the base station (e.g., using the antenna 234, MOD/DEMOD 232, TX MIMO processor 230, transmit processor 220, controller/processor 240, and/or memory 242) can transmit, to the UE, a third message. In some aspects, the third message may include a downlink control information (DCI) message or a media access control-control element (MAC-CE) message. Additionally, in some aspects the third message may indicate a selected measurement gap pattern index.

Implementation examples are described in the following numbered clauses.

1. A method for wireless communication performed by a user equipment (UE), comprising:
   transmitting, to a first network, a first message comprising a first measurement gap configuration, a measurement gap reconfiguration, a selection from a measurement gap pool, or a measurement gap release request;
   receiving a second message, from the first network:
      to configure, reconfigure, or release a measurement gap; and
      to suspend data communication from the UE during a configured measurement gap; and suspending communication with the first network during the configured measurement gap.

2. The method of clause 1, in which the first message comprises a first radio resource control (RRC) setup request message, a call resume request message, a handover request message, or a measurement report.

3. The method of any of clauses 1-2, in which the second message comprises a second RRC setup message, an RRC resume message, a handover command, or an RRC configuration message.

4. The method of any of clauses 1-3, in which: the first measurement gap configuration comprises a preferred measurement gap configuration, the preferred measurement gap configuration indicating at least one of a measurement gap periodicity, a measurement gap length, and a measurement gap valid timer duration.

5. The method of any of clauses 1-4, in which the second message comprises a second measurement gap configuration in accordance with the preferred measurement gap configuration, the measurement gap reconfiguration, and/or a measurement gap release.

6. The method of any of clauses 1-5, further comprising measuring a second network during a second measurement gap configured according to the second measurement gap configuration.

7. The method of any of clauses 1-6, further comprising receiving, from the first network, a third message comprising a measurement gap release.

8. The method of any of clauses 1-7, in which the third message comprises a radio resource control (RRC) reconfiguration message.

9. The method of clauses 1-8, in which the first message comprises a first radio resource control (RRC) message, a first medium access control-control element (MAC-CE) message, or a first channel state information (CSI) message, and the second message comprises a second RRC message, a second MAC-CE message, or a first downlink control information (DCI) message.

10. The method of any of clauses 1-9, in which the first measurement gap configuration comprises at least one of a measurement gap periodicity and a measurement gap length.

11. The method of any of clauses 1-10, in which the measurement gap length is in response to a quality of service (QoS), a battery level, or a device temperature.

12. The method of any of clauses 1-11, in which the first message comprises a bitmap for selecting the measurement gap from the measurement gap pool.

13. The method of any of clauses 1-12, further comprising tuning away from the first network during a second measurement gap configured in response to a second measurement gap configuration received in the second message.

14. The method of any of clauses 1-13, further comprising delaying transmission of a reconfiguration complete message.

15. The method of any of clauses 1-14, further comprising transmitting, to the first network, a third message requesting a measurement gap release, the third message comprising a third RRC message, a third MAC-CE message, or a second CSI message.

16. The method of any of clauses 1-15, further comprising receiving, from the first network, a fourth message comprising the measurement gap release, in which the fourth message comprises a fourth RRC message, a fourth MAC-CE message, or a second DCI message.

17. A method for wireless communication performed by a base station, comprising:

transmitting, to a user equipment (UE), a first message comprising a measurement gap configuration;
receiving, from the UE, a second message; and
transmitting, to the UE, a third message comprising at least one of a measurement gap setup, a measurement gap timer duration, or a measurement gap release.

18. The method of clause 17, in which:
the first message comprises a radio resource control (RRC) setup message, a RRC resume message, a handover command, a first RRC configuration message, or a master node measurement gap message; and
the third message comprises a second RRC reconfiguration message.

19. The method of any of clauses 17-18, in which the measurement gap configuration indicates at least one of a measurement gap periodicity, or a measurement gap length.

20. The method of any of clauses 17-19, further comprising:
initiating a measurement gap timer in response to transmitting the first message; and
transmitting the third message in response to expiration of the measurement gap timer.

21. The method of any of clauses 17-20, in which each of the first message and the third message comprises a radio resource control (RRC) message, a medium access control-control element (MAC-CE) message, or a downlink control information (DCI) message.

22. The method of any of clauses 17-21, in which the first message comprises a radio resource control (RRC) message indicating a table of measurement gap configurations and associated measurement gap pattern indices, and the third message comprises a downlink control information (DCI) message or a media access control-control element (MAC-CE) message, the third message indicating a selected measurement gap pattern index.

23. An apparatus for wireless communications at a user equipment (UE), comprising:
a processor,
memory coupled with the processor; and
instructions stored in the memory and operable, when executed by the processor, to cause the apparatus:
to transmit, to a first network, a first message comprising a first measurement gap configuration, a measurement gap reconfiguration, a selection from a measurement gap pool, or a measurement gap release request;
to receive a second message, from the first network:
to configure, reconfigure, or release a measurement gap; and
to suspend data communication from the UE during a configured gap; and
to suspend communication with the first network during the configured gap, the communication suspended to save power, perform a multiple subscriber identity module (MSIM) tune away, or measure a neighbor cell.

24. The apparatus of clause 23, in which the first message comprises a first radio resource control (RRC) setup request message, a call resume request message, a handover request message, or a measurement report.

25. The apparatus of any of clauses 23-24, in which the second message comprises a second RRC setup message, an RRC resume message, a handover command, or an RRC configuration message.

26. The apparatus of any of clauses 23-25, in which:
the first measurement gap configuration comprises a preferred measurement gap configuration, the preferred measurement gap configuration indicating at least one of a measurement gap periodicity, a measurement gap length, and a measurement gap valid timer duration.

27. The apparatus of any of clauses 23-26, in which the first message comprises a first radio resource control (RRC) message, a first medium access control-control element (MAC-CE) message, or a first channel state information (CSI) message, and the second message comprises a second RRC message, a second MAC-CE message, or a first downlink control information (DCI) message.

28. An apparatus for wireless communications at a base station, comprising:
    a processor,
    memory coupled with the processor; and
    instructions stored in the memory and operable, when executed by the processor, to cause the apparatus:
        to transmit, to a user equipment (UE), a first message comprising a measurement gap configuration;
        to receive, from the UE, a second message; and
        to transmit, to the UE, a third message comprising a measurement gap release.

29. The apparatus of clause 28, in which the measurement gap configuration indicates at least one of a measurement gap periodicity, or a measurement gap length.

30. The apparatus of any of clauses 28-29, in which the first message comprises a first radio resource control (RRC) message, a first medium access control-control element (MAC-CE) message, or a first channel state information (CSI) message, and the second message comprises a second RRC message, a second MAC-CE message, or a first downlink control information (DCI) message.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication performed by a user equipment (UE), comprising:
    delaying a reconfiguration complete message when a UE battery level is less than a battery threshold to extend a length of a first measurement gap;
    transmitting, to a first network, the reconfiguration complete message for dynamically releasing the first measurement gap; and
    receiving a downlink control information (DCI) message, from the first network, in response to the reconfiguration complete message, the DCI message dynamically indicating release of the first measurement gap.

2. A method for wireless communication performed by a base station, comprising:
    receiving, from a user equipment (UE), a first message for dynamically selecting a first measurement gap from a measurement gap pool;
    transmitting, to the UE, a second message in response to the first message in order to dynamically configure the first measurement gap;
    initiating a measurement gap valid timer in response to transmitting the second message; and
    releasing the measurement gap when the base station does not receive a measurement report before expiration of the timer.

3. An apparatus for wireless communications at a user equipment (UE), comprising:
    at least one processor,
    memory coupled with the at least one processor; and
    instructions stored in the memory and operable, when executed by the at least one processor, to cause the apparatus to:
        delay a reconfiguration complete message when a UE battery level is less than a battery threshold to extend a length of a first measurement gap;
        transmit, to a first network, the reconfiguration complete message for dynamically releasing a first measurement gap; and
        receive from the first network, a downlink control information (DCI) message in response to the reconfiguration complete message, the DCI message dynamically indicating release of the first measurement gap.

4. An apparatus for wireless communications at a base station, comprising:
    at least one processor,
    memory coupled with the at least one processor; and instructions stored in the memory and operable, when executed by the at least one processor, to cause the apparatus to:

receive a first message, from a user equipment (UE) the first message dynamically selecting a measurement gap; and transmit, to the user equipment (UE), a second message in response to the first message, in order to dynamically configure the measurement gap;

initiate a measurement gap valid timer in response to transmitting the second message; and release the measurement gap when the base station does not receive a measurement report before expiration of the timer.

5. The method of claim 1, further comprising transmitting a measurement gap configuration comprising a measurement gap valid timer duration.

6. The method of claim 1, further comprising transmitting a measurement report to the network in response to successfully measuring a neighbor cell during the first measurement gap.

7. The method of claim 1, further comprising transmitting a radio resource control (RRC) setup request message indicating a preferred measurement gap configuration.

8. The method of claim 1, further comprising transmitting a handover request message indicating a preferred measurement gap configuration.

9. The method of claim 2, wherein the timer has a duration corresponding to a measurement gap configuration received in the first message.

10. The method of claim 2, further comprising transmitting a third message including a measurement gap release in response to not receiving the measurement report before expiration of the timer.

11. The method of claim 10, wherein the third message comprises a radio resource control (RRC) reconfiguration message.

12. The method of claim 2, further comprising transmitting a third message including a measurement gap release in response to receiving the measurement report.

13. The apparatus of claim 3, wherein the instructions when executed by the at least one processor cause the apparatus to transmit a measurement gap configuration comprising a measurement gap valid timer duration.

14. The apparatus of claim 3, wherein the instructions when executed by the at least one processor cause the apparatus to transmit a measurement report to the network in response to successfully measuring a neighbor cell during the first measurement gap.

15. The apparatus of claim 3, wherein the instructions when executed by the at least one processor cause the apparatus to transmit a radio resource control (RRC) setup request message indicating a preferred measurement gap configuration.

16. The apparatus of claim 3, wherein the instructions when executed by the at least one processor cause the apparatus to transmit a handover request message indicating a preferred measurement gap configuration.

17. The apparatus of claim 4, wherein the timer has a duration corresponding to a measurement gap configuration received in the first message.

18. The apparatus of claim 4, wherein the instructions when executed by the at least one processor cause the apparatus to transmit a third message including a measurement gap release in response to not receiving the measurement report before expiration of the timer.

19. The method of claim 18, wherein the third message comprises a radio resource control (RRC) reconfiguration message.

20. The apparatus of claim 4, wherein the instructions when executed by the at least one processor cause the apparatus to transmit a third message including a measurement gap release in response to receiving the measurement report.

\* \* \* \* \*